United States Patent [19]
Ardesson

[11] Patent Number: 5,345,984
[45] Date of Patent: Sep. 13, 1994

[54] PIN ROUTER APPARATUS

[76] Inventor: William A. Ardesson, 1580 Ward Dr., Flint, Mich. 48532

[21] Appl. No.: 165,110

[22] Filed: Dec. 10, 1993

[51] Int. Cl.$^5$ .................................................. B27C 5/02
[52] U.S. Cl. ............................ 144/145 A; 144/134 A; 144/372; 409/97; 409/110
[58] Field of Search ............... 144/134 R, 134 A, 137, 144/144 R, 145 R, 145 A, 372; 409/97, 104, 110, 125, 130

[56] References Cited

U.S. PATENT DOCUMENTS

| | | | |
|---|---|---|---|
| 2,230,292 | 2/1941 | Faso | 409/87 |
| 2,624,242 | 1/1953 | Eberle et al. | 409/110 |
| 3,295,417 | 1/1967 | Hanlon | 409/110 |
| 4,192,363 | 3/1980 | Casadei | 144/145 A |
| 4,893,661 | 1/1990 | Onsrud | 144/134 A |
| 5,193,596 | 3/1993 | Patel | 144/145 A |

Primary Examiner—W. Donald Bray
Attorney, Agent, or Firm—Learman & McCulloch

[57] ABSTRACT

A router having a rotary bit is mounted on a table in a position to enable the bit to engage a workpiece on which is secured a template having a configuration corresponding to that to be duplicated on the workpiece. A template follower overlies and confronts the bit and has a socket in its lower end in which the tip of the bit may be accommodated to ensure that the bit and the follower are coaxial. The socket is defined by a side wall which is adapted to engage the edge of the template and thereby prevent engagement between the bit and the template.

14 Claims, 3 Drawing Sheets

PIN ROUTER APPARATUS

This invention relates generally to wood working machine tools and more particularly to a pin router assembly which facilitates the forming of a workpiece to the configuration of a template.

BACKGROUND OF THE INVENTION

A pin router is a wood working machine tool used primarily for cutting a wood workpiece to the shape of a template. The router conventionally is mounted below the upper surface of a table which supports the workpiece and has an opening through which the rotatable router bit extends.

A template conventionally is secured to the upper surface of the workpiece and has a configuration corresponding to that which is to be reproduced on the workpiece. The template and workpiece together are moved past the router bit so as to follow the contour of the template as the workpiece is cut.

In some router constructions the bit is partially covered by a rotatable sleeve which is capable of engaging the template to protect it from being cut by the bit. This kind of construction is considerably more expensive than bits which do not include the sleeve. Furthermore, the bearings used to mount such sleeves often become clogged with sawdust and bind, thereby preventing relative rotation between such sleeve and its bit.

An object of this invention is to overcome the disadvantages referred to above of the known constructions.

SUMMARY OF INVENTION AND ADVANTAGES

Routing apparatus for cutting a workpiece to the shape of a template comprises a rotary cutting element or bit that extends through the table opening and has a free end at a level above that of the upper surface of the table. A guide pin depends from a support and has an outer surface adapted to engage a template secured to the workpiece for guiding the workpiece as it is moved relative to the bit. The guide pin has a socket at its lower end for the accommodation of the upper free end of the bit. The socket and the bit are of such size as to ensure a coaxial relationship between the bit and the guide pin when the bit occupies the socket.

THE DRAWINGS

THE PREFERRED EMBODIMENT

Figure 4:
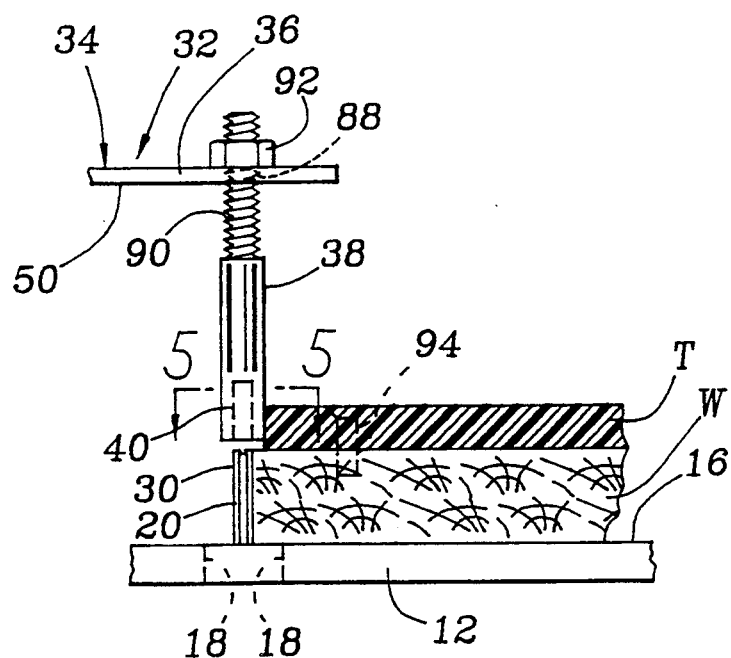
FIG. 4 is a fragmentary view partly in elevation and partly in section showing the guide pin in a position for guiding the workpiece with respect to the router bit.

Pin router apparatus constructed according to a presently preferred embodiment of the invention is designated generally by the reference numeral 10 and comprises a supporting table 12 mounted on a frame 14, and table having an upper, planar, generally horizontal surface 16 for supporting a workpiece W such as a wood blank W (see FIG. 4). The table 12 has a suitable opening 18 through which a rotary router bit 20 extends.

A router housing 22 is mounted on the underside of the table 12 by fasteners 24 in a conventional manner. The housing encloses an electric motor (not shown) having an armature shaft 26 to which is separably secured one end of the bit 20 by a suitable chuck 28. The bit extends upwardly through the opening 18 in prolongation of the shaft 26 along an axis A normal to the upper surface 16. The bit terminates in a free end 30 located at a level above that of the upper surface 16 of the table 12. The bit 20 has one or more cutting edges for removing material from the workpiece W as the bit 20 traverses the workpiece. The length of the bit that extends above the table surface is at least as great as the thickness of the workpiece W.

Workpiece guide apparatus 32 includes an L-shaped member 34 having an arm 36 spaced above the upper surface 16 of the table 12 and overlying the bit 20. A guide pin 38 is supported by the arm 36 and extends downwardly along a vertical axis B (FIG. 2) to a level at which its free end 40 is adjacent the free end 30 of the bit. The axes A and B should be coaxial.

The guide assembly 32 is provided with axial and lateral adjustment means for adjusting the guide pin 38 relative to the axis A of the cutting element 20 to any selected one of a plurality of positions.

The guide assembly 32 is detachably mounted to the table 12 and includes a lower base 42 supported on the upper surface 16 of the table 12. The base has at least one and preferably two elongate slots 44 extending laterally of the axes A, B and accommodate one or more fasteners 46 secured to the table 12 and having threaded shank portions projecting above the upper surface of the table 12 for reception in the slot of the base. The effective length of each slot 44 is greater than the spacing between the fasteners 46, thereby enabling the guide assembly 32 to be slid laterally across the upper surface of the table while being guided by the fasteners 46. Anchor nuts 48 separably secure the guide arm assembly 32 to the table 12.

The guide assembly 32 includes coarse and fine adjusting means for axial positioning of the guide pin 38. The coarse adjusting means comprises the second arm 50 of the L-shaped member 34 which is coupled by an axial adjustment device 52 that enables the arm 50 to move vertically relative to the surface of the table for raising or lowering the guide pin 38. As shown best in FIG. 2, the leg 50 is coupled by means of an adjusting device 52 to a pair of upstanding legs 54 and 56 of the base 42.

The leg 56 of the base 42 is secured to a mounting section 58 which extends horizontally in a direction away from the guide pin 38. The mounting section 58 is secured to the top of the table 12.

Figure 3:
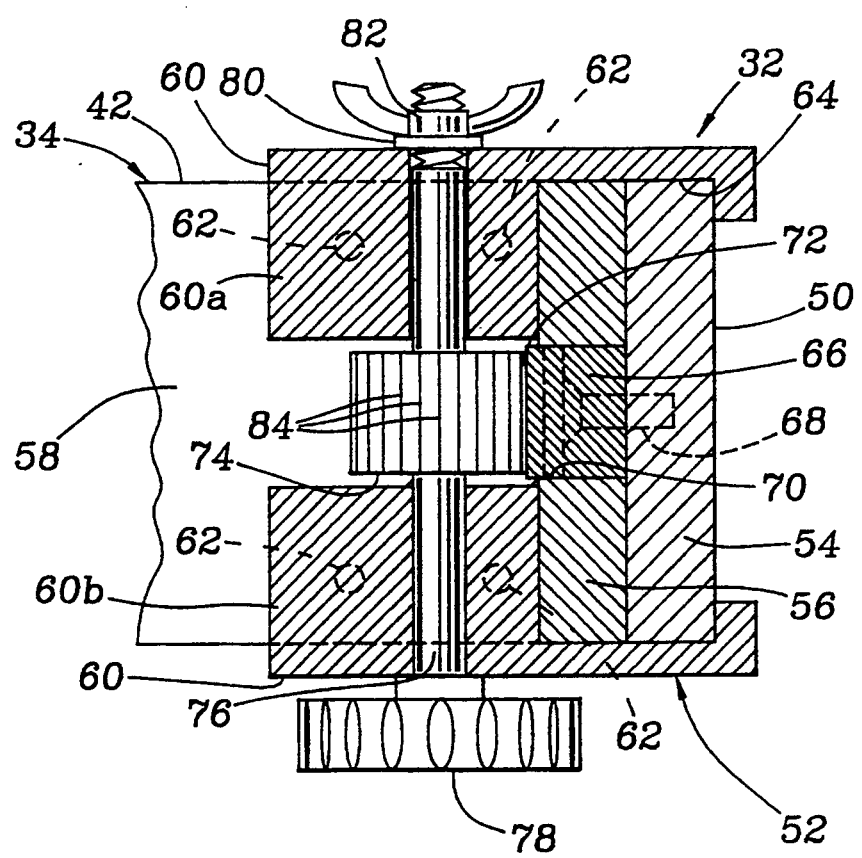
FIG. 3 is a sectional view taken along the line 3—3 of FIG. 2.

The adjustment device 52 includes a connecting block 60 formed of two mirror image halves 60a, 60b each of which is fixed to the base 42 by fasteners 62 or other suitable means in laterally spaced, facing relation to one another, as illustrated best in FIG. 3. The connecting block 60 has a vertically extending channel 64 accommodating each of the vertical legs 54 and 56 for vertical movement relative to the connecting block 60 so as to raise and lower the guide pin 38 along the axis B.

A rack 66 is secured to the leg 54 by fasteners 68 and projects laterally through an elongate slot 70 between the legs 54 and 56. The rack 66 has a series of vertically spaced teeth 72.

A pinion 74 is mounted between the connecting block halves 60a, 60b by an axle 76 that extends between and is journalled in the connecting block halves 60a and 60b. The pinion 74 is keyed or otherwise fixed to the axle 76 for rotation therewith relative to the connecting block 60. The axle has a knob 78 fixed to one end thereof for rotation by the user to move the gear in opposite directions. The opposite end of the axle 76 is threaded and extends beyond the other connecting block half 60a and supports a lock washer 80 and a threaded nut 82 for securing the axle 76 to the connecting block 60 while enabling the axle 76 and pinion gear 74 to rotate relative to the connecting block.

The pinion 74 has a series of circumferentially spaced teeth 84 in mesh with the teeth 72 of the rack 66 so that rotation of the pinion in one direction drives the rack and hence the guide pin 38 vertically. Sliding friction between the relatively movable parts is sufficient to maintain the guide assembly 32 in any selected one of a plurality of positions of vertical adjustment.

Figure 1:
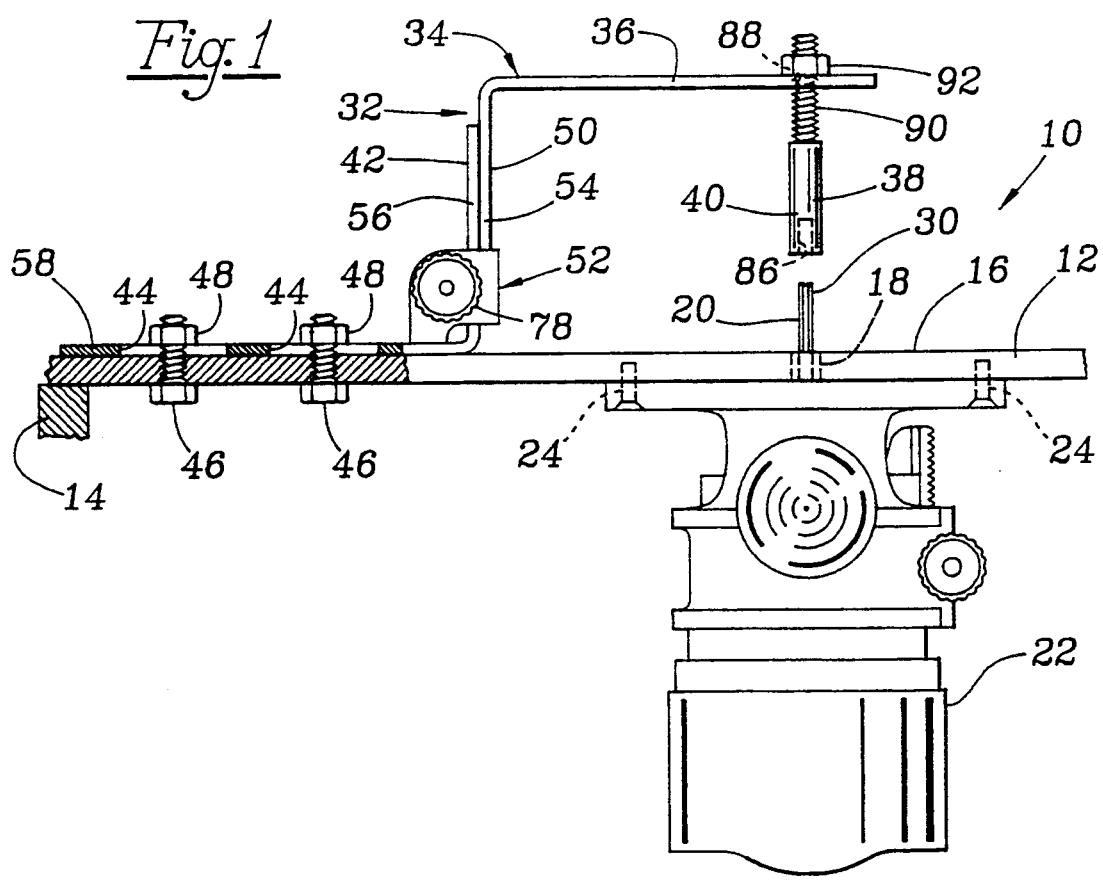
FIG. 1 is a view partly in side elevation and partly in section of the router, the support table, and a guide assembly.
Figure 2:
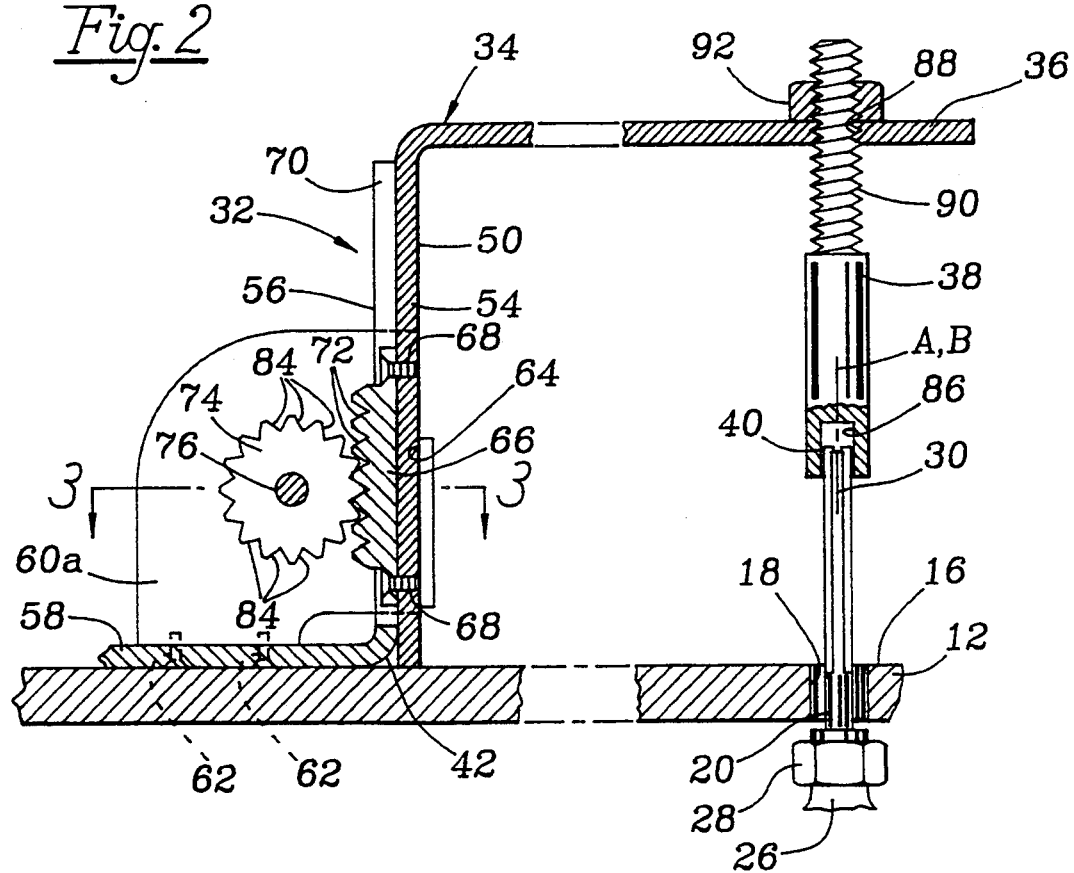
FIG. 2 is an enlarged, fragmentary sectional view of the apparatus of FIG. 1 shown in an adjusted position.

FIG. 1 shows the guide assembly in an elevated position wherein the free end 40 of the guide pin 38 is well above the level of the free end 30 of the bit 20, whereas FIG. 2 illustrates a lowered position of the guide assembly.

As shown best in FIG. 2, the guide pin 38 has a socket 86 at the free end of the guide pin. The socket 86 is cylindrical and of such diameter and depth as fairly closely to accommodate at least a portion of the bit when the guide assembly is moved to the lowered position of FIG. 2. The free end of the guide pin 38 has an outer diameter that is larger than that of the bit for a purpose to be explained shortly.

Fine vertical adjustment of the axial position of the guide pin 38 is provided by an internally threaded aperture 88 of the arm 36 through which the correspondingly threaded upper end 90 of the guide pin 38 extends. A lock nut 92 on the pin portion 90 permits locking of the pin 38 in a selected position of vertical adjustment.

THE OPERATION

The guide assembly is adjusted laterally and vertically relative to the bit 20 to the position shown in FIG. 2 wherein the free end 30 of the bit extends at least partially into the socket 86 of the guide pin 38 to ensure axial alignment of the guide pin and the bit. The guide assembly then may be adjusted vertically to raise the pin 38 to the operative position shown in FIGS. 1 and 4.

Figure 5:
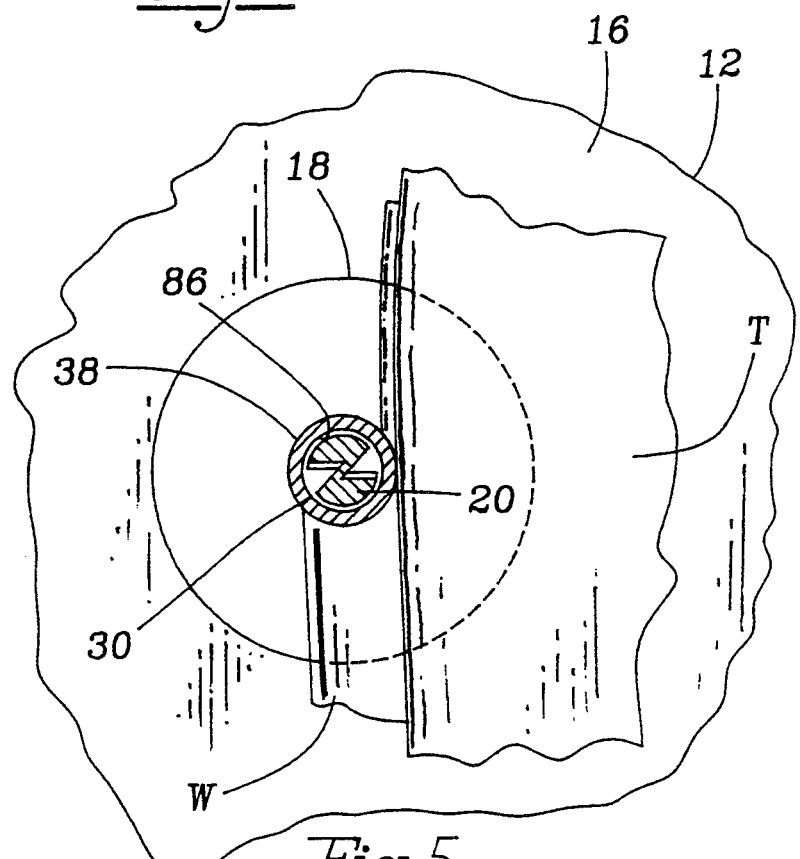
FIG. 5 is a sectional view taken along the line 5—5 of FIG. 4.

The template T is secured to the upper surface of the workpiece or blank W via fasteners 94 or other suitable means. The workpiece is relatively larger in size than the template so that the marginal edges of the workpiece extend laterally beyond the marginal edges of the template for engagement by the cutting surface of the bit 20. To cut the workpiece W to the shape of the template, one side edge of the template is guided by the operator into engagement with the outer surface of the guide pin 38 causing the underlying bit 20 to cut through the workpiece W and thereby impart a shape to the workpiece corresponding to that of the template T, as illustrated in FIG. 5. The relatively larger diameter guide pin 38 maintains the cutting surface of the bit 20 spaced from the edge of the template T by a distance corresponding to the wall thickness of the pin 38 at the socket 86, as shown in FIGS. 4 and 5, thereby ensuring that there is no engagement between the bit and the template T. As a result, the workpiece W has the same shape as the template, but is relatively larger in size on all sides by an amount corresponding to the wall thickness of the guide pin. This wall thickness may be as thin as 0.0312 inch.

By avoiding engagement between the rotating bit and the template it is not necessary to provide rotary sleeves on the bit, thereby saving the expense of such sleeves and problems encountered when the bearings of such sleeves freeze or stick. It also enables the bit of the router to be adjusted axially relative to the router drive shaft and/or the workpiece so as to enable different portions of the bit cutting surface of the bit to be used to cut workpieces. This characteristic of the invention is advantageous because it minimizes the number of times a bit must be sharpened or replaced.

Various kinds of bits may be used in connection with the template follower apparatus. A flush trim router bit is illustrated in the drawings.

The disclosed embodiment is representative of the preferred form of the invention, but is intended to be illustrative rather than definitive thereof. The invention is defined in the claims.

I claim:

1. In routing apparatus for use in cutting a workpiece to the shape of a template secured to said workpiece and including workpiece support means having a generally horizontal upper surface and an opening through said table, a rotary router bit extending through said opening and having a free end at a level above that of said table surface, and means for rotating said bit about an axis, the improvement comprising:

a guide pin overlying said table and extending toward the upper surface thereof, said guide pin having a socket at its lower end for accommodating the free end of said bit;

and adjusting means for locating said bit and said socket relative to one another so that said socket accommodates said free end of said bit and ensures a coaxial relationship between said bit and said guide pin.

2. The apparatus of claim 1 wherein said socket is defined by a side wall of said guide pin.

3. The apparatus of claim 1 wherein said adjusting means is coupled to said guide pin for adjusting said guide pin axially relative to said bit.

4. The apparatus of claim 3 wherein said adjusting means comprises threaded means enabling axial movement of said guide pin relative to said bit.

5. The apparatus of claim 3 wherein said adjusting means has a lower base section secured to said support means and a separate upper section, and means coupling said lower and upper sections together for axial adjustment of said guide pin relative to said bit.

6. The apparatus of claim 5 wherein said coupling means comprises a rack secured to one of said sections and a pinion rotatably carried the other in mesh with said rack.

7. The apparatus of claim 6 wherein said other of said sections has an elongate, axially extending slot slideably accommodating said rack.

8. The apparatus of claim 6 wherein said coupling means includes a connecting block secured to said other of said sections and mounting said pinion, said connecting block having an axially extending channel slideably accommodating said one of said sections and supporting said rack.

9. The apparatus of claim 5 wherein each of said sections is L-shaped.

10. The apparatus of claim 1 wherein said adjusting means is coupled to said guide pin for adjusting said guide pin laterally relative to said bit.

11. Apparatus for use with a router having a bit rotatable about an axis and extending vertically above the surface of a workpiece support, said apparatus comprising:

a supporting arm overlying said workpiece support;

a guide pin carried by and depending from said arm, said guide pin terminating at its lower end in a socket; and means for adjusting said guide pin laterally and axially of said bit, said guide pin terminating at its lower end in a socket of such size as to accommodate a portion of said bit and enable said guide pin and said bit to be coaxial, said socket being defined by a side wall that is engageable with said template to prevent engagement of said bit with said template.

12. The apparatus of claim 11 wherein said adjusting means includes a base section and an upper section slideable vertically relative to said base section, and coupling means interconnecting said upper section and said base section and enabling relative vertical movements of said sections.

13. The apparatus of claim 12 wherein said coupling means comprises a toothed rack secured to one of said sections and a pinion supported by the other of said sections in mesh with said rack.

14. Apparatus for routing a workpiece to conform to the configuration of a template that is secured atop said workpiece, said apparatus comprising a router having a bit rotatable about an axis; means for mounting a router in a position to enable said bit to engage said workpiece; a template follower; means supporting said follower in a position overlying and confronting said bit and for movements toward and away from said bit, said follower having a socket therein of such size as to accommodate a portion of said bit; and means mounting said follower for movements laterally of said axis to a position in which said socket and said bit are coaxial, said socket being defined by a side wall of said follower which is engageable with said template to prevent engagement of said bit with said template.

* * * * *